(12) United States Patent
Shen

(10) Patent No.: US 10,146,903 B2
(45) Date of Patent: Dec. 4, 2018

(54) HIGH FIDELITY AND HIGH EFFICIENCY METHOD FOR SONIC BOOM PREDICTIONS IN SUPERSONIC FLIGHTS

(71) Applicant: THE BOEING COMPANY, Chicago, IL (US)

(72) Inventor: Hao Shen, Maryland Heights, MO (US)

(73) Assignee: THE BOEING COMPANY, Chicago, IL (US)

( * ) Notice: Subject to any disclaimer, the term of this patent is extended or adjusted under 35 U.S.C. 154(b) by 450 days.

(21) Appl. No.: 14/938,406

(22) Filed: Nov. 11, 2015

(65) Prior Publication Data

US 2017/0132356 A1 May 11, 2017

(51) Int. Cl.
| | |
|---|---|
| *G06F 7/60* | (2006.01) |
| *G06F 17/10* | (2006.01) |
| *G06F 17/50* | (2006.01) |
| *B64C 30/00* | (2006.01) |

(52) U.S. Cl.
CPC .......... *G06F 17/5095* (2013.01); *B64C 30/00* (2013.01); *G06F 2217/82* (2013.01)

(58) Field of Classification Search
None
See application file for complete search history.

(56) References Cited

U.S. PATENT DOCUMENTS

2005/0098681 A1* 5/2005 Berson .................. B64C 30/00
244/1 N

OTHER PUBLICATIONS

Tam et al., "Direct Computation of Nonlinear Acoustic Pulses Using High-Order Finite Difference Schemes", Depart. of Mathematics, Florida State University, 15th AIAA Aeroacoustics Conference Oct. 25-27, 1993 Long Beach , CA, Downloaded on Jul. 10, 20151 http:arc.aiaa.org, consists of 17 pages.
Sriram K. Rallabhandi, "Advanced Sonic Boom Prediction Using Augmented Burgers Equation", National Institute of Aerospace, Hampton, Virginia 23666, Journal of Aircraft, vol. 48, No. 4, Jul.-Aug. 2011, pp. 1245-1253.
Kenneth J. Plotkin, "State of the art Sonic Boom Modeling", Wyle Laboratories, 2001 Jefferson Davis Highway, Suite 701, Arlington, Virginia 22202 (accepted for publication Apr. 18, 2001) J. Acoust. Soc. Am 111 (1) Pt. 2, Jan. 2002, 2002 Acoustical Society America, pp. 530-536.

(Continued)

*Primary Examiner* — Timothy A Mudrick
(74) *Attorney, Agent, or Firm* — Patterson + Sheridan, LLP

(57) ABSTRACT

A computer-implemented sonic boom prediction method for use in designing a supersonic aircraft is disclosed herein. The method includes receiving physical parameters and performance parameters for a supersonic aircraft, generating a three-dimensional (3D) flow field around the supersonic aircraft for at least one airspeed using a CFD model in a first region of a near field bounded by a first radial distance and a propagation model in a second region of the near field bounded by the first radial distance and the second radial distance. The 3D flow field generated by the CFD model is used as a boundary condition for the propagation model. The method further includes estimating sonic boom signatures on a ground surface using a long distance sonic boom propagation model that incorporates the 3D flow field estimated by the propagation model as an initial condition. The parameters are adjusted to reduce estimated sonic boom signatures.

20 Claims, 9 Drawing Sheets

(56) References Cited

OTHER PUBLICATIONS

Tam et al., "Dispersion-Relation-Preserving Finite Difference Schemes for Computational Acoustics", Depart. of Mathematics, Florida State University, Tallahassee, Florida, 32306-3027, revised Sep. 14, 1992, Journal of Computational Physcis 107, pp. 262-281 (1993).

Yamaleev et al., "Space-Marching Method for Calculating Steady Supersonic Flows on a Grid Adapted to the Solution", Journal of Computational Physics 146, pp. 436-463 (1998), Article No. CP986073, Depart of Computational Mathematics, Institute of Mathematics, Russian Academy of Sciences,Chernyshevsky Street 112, 450000 Ufa, Russia; Templergraben 64, 52056 Aachen, Germany, E-mail: nail@imat.rb.ru, ballmann@lufmech.rwth-aachen.de, revised Jul. 30, 1998, Copyright 1998 by Academic Press.

Aftosmis et al., "Adjoint-Based Low-Boom Design with Cart3D", 29th AIAA Applied Aerodynamics Conference, Jun. 27-30, 2011, Honolulu, Hawaii, NASA Ames, Moffett Field, CA 94035, Science & Technology Corp., Moffett Field, CA 94035, American Institute of Aeronautics and Astronautics, pp. 1-17.

Michael A. Park, "Low Boom Configuration Analysis with FUN3D Adjoint Simulation Framework", American Institute of Aeronautics and Astronautics, Research Scientist, Computational AeroSciences Branch, NASA Langley Research Center, MS 128, Hampton, VA 23681,AIAA Senior Member, http://fun3d.larc.nasa.gov [accessed Jun. 2011]. pp. 1-22.

Choi, et al., "Numerical and Mesh Resolution Requirements for Accurate Sonic Boom Prediction of Complete Aircraft Configurations" 42nd AIAA Aerospace Sciences Meeting & Exhibit Jan. 5-8, 2004/Reno, NV, American Institute of Aeronautics and Astronautics Paper 2004{1060, Copyright c 2004 by the authors. Published by the American Institute of Aeronautics and Astronautics, Inc. with permission.pp. 1-18.

* cited by examiner

HIGH FIDELITY AND HIGH EFFICIENCY METHOD FOR SONIC BOOM PREDICTIONS IN SUPERSONIC FLIGHTS

BACKGROUND

The present disclosure relates to supersonic aircraft design, and more specifically, to a computer-implemented sonic boom prediction method for use in designing a supersonic aircraft.

A sonic boom is sound associated with shock waves created when an object travels through air faster than the speed of sound. It is one of the problems that need to be accounted for in the design of aircrafts that travel at supersonic speed. Generally, there are concerns about weight, size, complexity, reliability, cost, and concerns related to performance, but noise suppression for supersonic aircrafts is one of the more critical technical problems to be solved in making an environmentally acceptable commercial supersonic aircraft. Sonic booms need to be minimized in order to reduce or eliminate public annoyance from supersonic flight over land.

The design of supersonic aircrafts has been hindered due to limitations in the current models for sonic boom prediction. A near-field pressure distribution at a distance sufficiently far away from the aircraft is needed for accurate ground signature prediction. Existing near-field sonic boom prediction methods use conventional general purpose computational fluid dynamics (CFD) approaches that rely on a computational mesh to cover the large near-field domain. The finer the mesh, the greater the number of points generated for CFD analysis, and thus, a more accurate sonic boom prediction. However, as the number of points generated increases, the time it takes to calculate the CFD solution increases exponentially. Thus, in order for CFD approaches to be used practically in the sonic boom prediction methods, a coarser mesh or a reduced near-field domain is applied at the expense of accuracy.

SUMMARY

A computer-implemented sonic boom prediction method for use in designing a supersonic aircraft, according to a first embodiment, is disclosed herein. The method comprises receiving physical parameters and performance parameters for a supersonic aircraft, generating a three-dimensional (3D) flow field around the supersonic aircraft for at least one airspeed and at least one flight altitude using a CFD model in a first region of a near field bounded by a first radial distance and a propagation model in a second region of the near field bounded by the first radial distance and a second radial distance. The 3D flow field generated by the CFD model is used as a boundary condition for the propagation model. The method further comprises estimating sonic boom signatures on a ground surface using a long distance sonic boom propagation model that incorporates the 3D flow field estimated by the propagation model as an initial condition. The parameters of the supersonic aircraft are adjusted to reduce estimated sonic boom signatures.

The computer-implemented sonic boom prediction method according to the first embodiment, wherein the first radial distance defines a cylindrical surface enclosing the entire aircraft at a distance of about 0.5 times an aircraft length, and the second radial distance is greater than the first radial distance and is about 10.0 times the aircraft length.

The computer-implemented sonic boom prediction method according to the first embodiment further comprising a far field region spanning a distance between the second radial distance and a position on the ground surface under a flight path of the aircraft.

The computer implemented sonic boom prediction method according to the first embodiment, wherein the first radial distance encloses the entire aircraft, and the second radial distance is greater than the first radial distance.

The computer-implemented sonic boom prediction method according to the first embodiment, wherein the sonic boom signatures on the ground surface are estimated at positions on the ground directly under a flight path of the supersonic aircraft and at other positions that are offset by an angle with respect to the flight path of the supersonic aircraft.

The computer-implemented sonic boom prediction method according to the first embodiment, wherein generating the 3D flow field around the supersonic aircraft using the propagation model comprises performing a space marching method from upstream to downstream in an annulus volume between the first radial distance and the second radial distance.

The computer-implemented sonic boom prediction method according to the first embodiment, wherein the space marching method comprises iteratively choosing multiple points between the first radial distance and the second radial distance to calculate derivatives in radial and azimuth directions and to update the flow solution, the multiple points being chosen to improve wave propagation from the first radial distance to the second radial distance.

The computer-implemented sonic boom prediction method according to the first embodiment, wherein using the long distance sonic boom propagation model comprises generating a one-dimensional wave propagation model along a ray path extending from the second radial distance to the ground surface.

Moreover, aspects herein include any alternatives, variations, and modifications of the preceding arrangement or configurations of the computer-implemented sonic boom prediction method recited above.

A system for modeling sonic boom signatures of a supersonic aircraft in connection with a design of the supersonic aircraft, according to a second embodiment, is disclosed herein. The system comprises a processor and a memory storing program code, which, when executed on the processor performs an operation for computer-implemented sonic boom prediction. The operation receiving physical parameters and performance parameters for a supersonic aircraft and generating a three-dimensional (3D) flow field around the supersonic aircraft for at least one airspeed and at least one flight altitude using a CFD model in a first region of a near field bounded by a first radial distance and a propagation model in a second region of the near field bounded by the first radial distance and a second radial distance. The 3D flow field generated by the CFD model is used as a boundary condition for the propagation model. The operation further comprises estimating sonic boom signatures on a ground surface using a long distance sonic boom propagation model that incorporates the 3D flow field estimated by the propagation model as an initial condition.

The system according to the second embodiment, wherein the first radial distance defines a cylinder surface enclosing the entire aircraft in a distance of about 0.5 times an aircraft length, and the second radial distance is greater than the first radial distance and is about 10.0 times the aircraft length.

The system according to the second embodiment, wherein the first radial distance encloses the entire aircraft and the second radial distance is greater than the first radial distance.

The system according to the second embodiment, wherein generating the 3D flow field around the supersonic aircraft using the propagation model comprises performing a space marching method from upstream to downstream in an annulus volume between the first radial distance and the second radial distance.

The system according to the second embodiment, wherein the space marching method comprises iteratively choosing multiple points between the first radial distance and the second radial distance to calculate derivatives in radial and azimuth directions and to update the flow solution, the multiple points being chosen to improve wave propagation from the first radial distance to the second radial distance.

The system according to the second embodiment, wherein the sonic boom signatures on the ground surface are estimated at positions on the ground directly under a flight path of the supersonic aircraft and at other positions that are offset by an angle with respect to the flight path of the supersonic aircraft.

The system according to the second embodiment, wherein estimating sonic boom signatures on the ground using the long distance sonic boom propagation model comprises generating a one-dimensional wave propagation model along a ray path extending from the second radial distance to the ground.

Moreover, aspects herein include any alternatives, variations, and modificaitons of the preceding arrangement or configurations of the system recited above.

A computer readable storage medium having stored thereon instructions that, when executed by a processor, cause the processor to perform a sonic boom prediction method for use in designing a supersonic aircraft, according to a third embodiment, is disclosed herein. The method includes receiving physical parameters and performance parameters for a supersonic aircraft, generating a three-dimensional (3D) flow field around the supersonic aircraft for at least one airspeed and at least one flight altitude using a CFD model in a first region of a near field bounded by a first radial distance and a propagation model in a second region of the near field bounded by the first radial distance and a second radial distance, wherein the 3D flow field generated by the CFD model is used as a boundary condition for the propagation model. The method further includes estimating sonic boom signatures on a ground surface using a long distance sonic boom propagation model that incorporates the 3D flow field estimated by the propagation model as an initial condition.

The computer readable storage medium according to the third embodiment, wherein the first radial encloses the entire aircraft, and the second radial distance is greater than the first radial distance.

The computer readable storage medium according to the third embodiment, wherein the sonic boom signatures on the ground are estimated at positions on the ground directly under a flight path of the supersonic aircraft and at other positions that are offset by an angle with respect to the flight path of the supersonic aircraft.

The computer readable storage medium according to the third embodiment, wherein estimating the second model in the second near field region from the first radial distance to the second radial distance, comprises performing a space marching method between the first radial distance and the second radial distance.

The computer readable storage medium according to the third embodiment, wherein generating the 3D flow field around the supersonic aircraft using the propagation model comprises performing a space marching method from upstream to downstream in an annulus volume between the first radial distance and the second radial distance.

Moreover, aspects herein include alternatives, variations, and modifications of the preceding arrangement or configurations of the computer readable storage medium recited above.

The features, functions, and advantages that have been discussed can be achieved independently in various embodiments or may be combined in yet other embodiments further details of which can be seen with reference to the following description and drawings.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Figure 1:
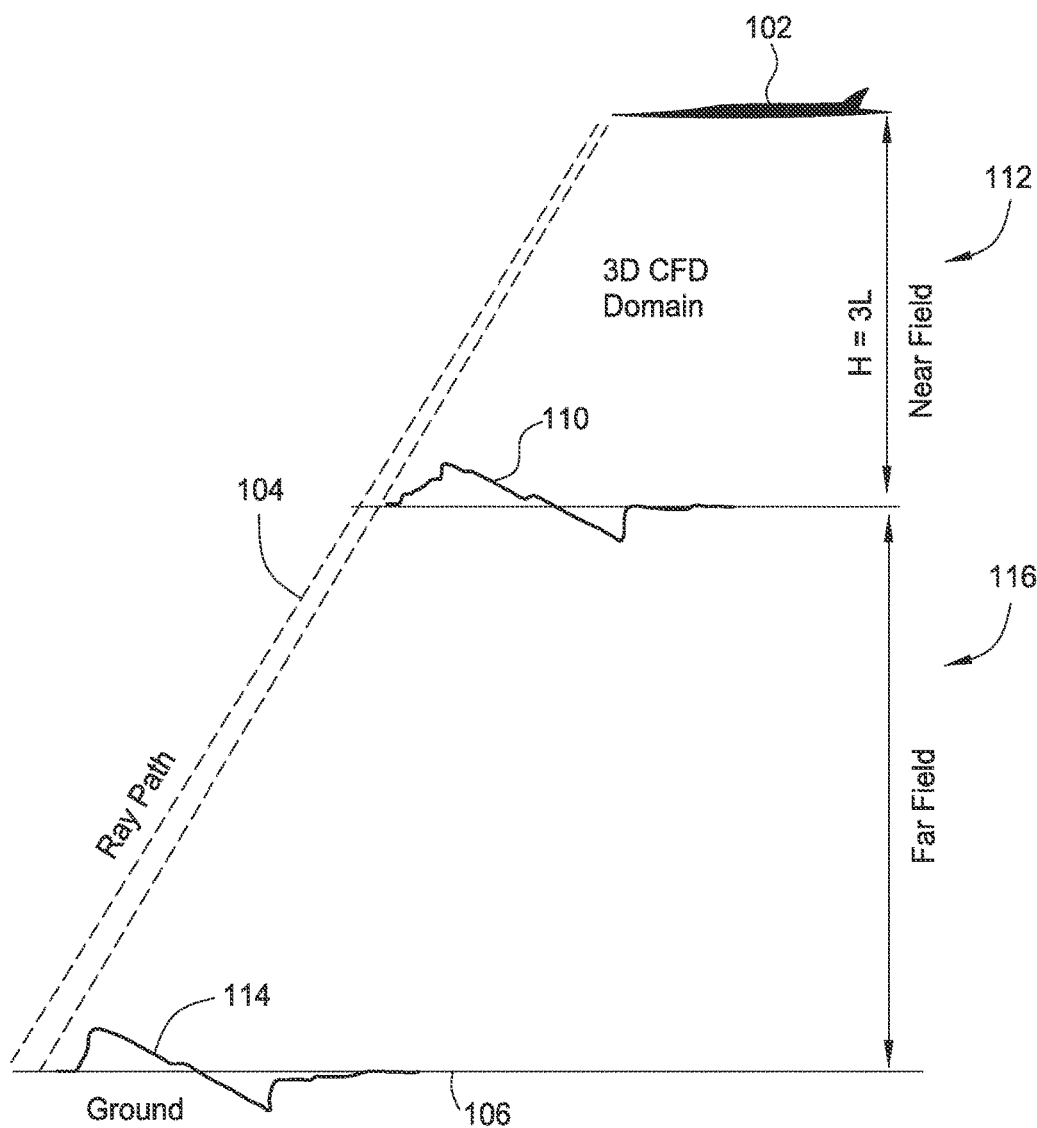
FIG. 1 schematically depicts a conventional sonic boom prediction method used in designing a supersonic aircraft.

FIG. 1 schematically depicts a conventional sonic boom predict method used in designing a supersonic aircraft 102.

When the aircraft 102 travels at supersonic speed, there is a rise in pressure at the nose of the aircraft 102 that decreases steadily to a negative pressure at the tail. The decrease in pressure is followed by a sudden return to normal pressure. The overpressure profile is also known as a sonic boom signature. A sonic boom is experienced when there is a sudden change in pressure. Thus, two booms occur in the signature: the first with the initial pressure-rise, and the second when the pressure returns to normal.

To predict the sonic boom caused by the supersonic aircraft, the conventional method generates a first signature 110 in a near field region 112 and a second signature 114 in a far field region 116. The first signature 110 is a CFD solution of the flow around the aircraft 102. The CFD solution employs a computational mesh for the aircraft 102 in the near field region 112. In typical applications, the near field region 112 has a radial distance of about three aircraft lengths (3.0 L).

The first signature 110 is used as an initial condition to generate the second signature 114. A one-dimensional far-field sonic boom propagation model is used to generate the second signature by calculating the propagation of the first signature 110 to the ground 106. The first signature 110 is propagated along a ray path 104 extending from the flight altitude of the aircraft 102 to the ground 106. Because the far-field sonic boom propagation model is a one-dimensional approximation, it would be preferable to obtain a near field CFD solution at greater radial distances than 3.0 L to achieve accurate prediction for ground signature 114; in fact 10.0 L would be preferred in real aircraft design. However, it is very difficult to obtain high accuracy flow solutions at radial distances from the aircraft greater than 3.0 L, because either (1) the solutions are not obtainable at reasonable amount of computational time at a necessary fine grid resolution or (2) at an affordable grid resolution low order numerical approximation methods used in majority of the CFD models introduce unacceptable amount of numerical errors beyond the typical three body length distance.

An efficient high accuracy numerical prediction method for acoustic and shock wave propagations is disclosed in Tam C. K. W. and Shen, H. (1993) "Direction Computation of Nonlinear Acoustic Pulses Using High-Order Finite Difference Schemes," AIAA Paper 93-4325. This method employs an optimized high-order finite difference numerical model to minimize numerical errors and achieve high accuracy in long distance wave propagation. The model, however, is formulated as a time marching algorithm in a ground based coordinate system in which the sonic boom signature is moving in time. In the embodiments of this disclosure, the model is reformulated as a high accuracy space marching algorithm in an aircraft based coordinate system in which the supersonic flow field is stationary. A space marching method is much more efficient than a general purpose CFD method in predicting the 3D sonic boom field because it effectively changes a three dimensional problem into a two dimensional problem.

Figure 2:
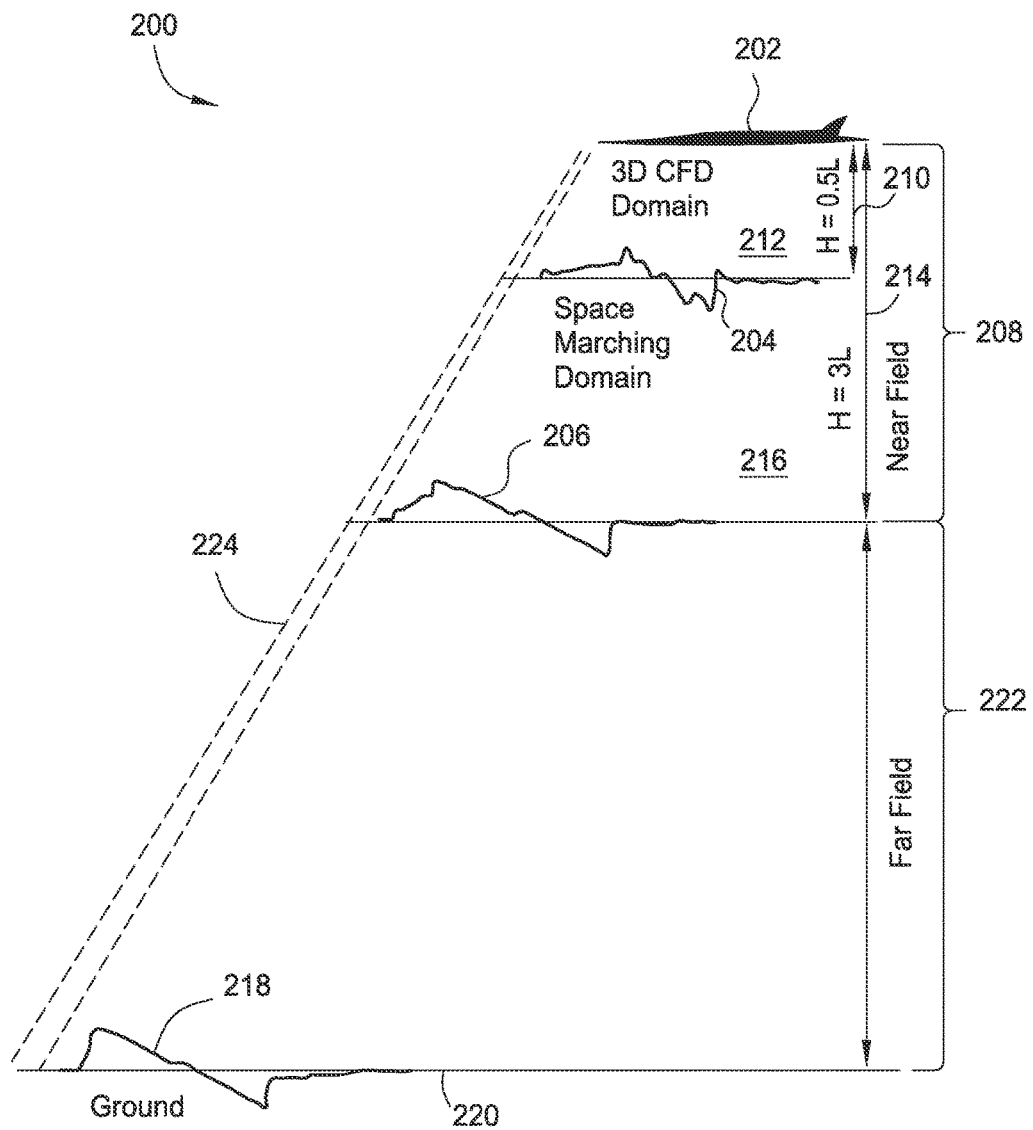
FIG. 2 illustrates an improved model of sonic boom prediction for use in designing a supersonic aircraft, according to one embodiment.

FIG. 2 schematically depicts a sonic boom prediction method used in designing a supersonic aircraft 202, according to one embodiment. In model 200, a near field region 208 is partitioned into two domains: a CFD domain 212 and a space marching domain 216. A first signature 204 is generated out to a first radial distance 210 forming the CFD domain 212. The first radial distance 210 defines a cylinder surface that encloses the entire aircraft, preferably at a close distance to the aircraft. For example, the first radial distance 210 is equal to half the length of the aircraft 202 (i.e., 0.5 L). The first signature 204 is generated using general purpose CFD approaches. Because the CFD domain is 0.5 L, instead of 3.0 L in the conventional method, a finer computational mesh is employed in the embodiment and thus a more accurate solution is obtained and less computational time is spent.

A second signature 206 is generated out to a second radial distance 214 forming the space marching domain 216, using the first signature 204 as a boundary condition. The second radial distance 214 is greater than the first radial distance 210, and is preferably 3.0 L to 10.0 L.

A space marching model is used to generate the second signature 206 using the first signature 204 as a boundary condition. The space marching model is much less computationally expensive than CFD models and thus the near field approximations of three-dimensional flow field can be easily extended out to a distance of 10.0 L. Additionally, the accuracy of the space marching model ensures that high accuracy for sonic boom signature is maintained even at a distance of 10.0 L.

In model 200, a third signature 218 is generated on a ground surface 220 using a long distance sonic boom propagation model in a far field region 222. The second signature 206 is used as an initial condition for the long distance sonic boom propagation model. The long distance boom propagation model follows a ray path 224 from the aircraft 202 at flight altitude to the ground surface 220. In other embodiments, the signatures generated on the ground surface 220 may be estimated at other positions on the ground surface that are offset by an angle with respect to the flight path of the supersonic aircraft. For example, the signatures may be estimated at positions on the ground where the angle with respect to the flight path of the supersonic aircraft is between 0° and 45°.

Figure 3A:
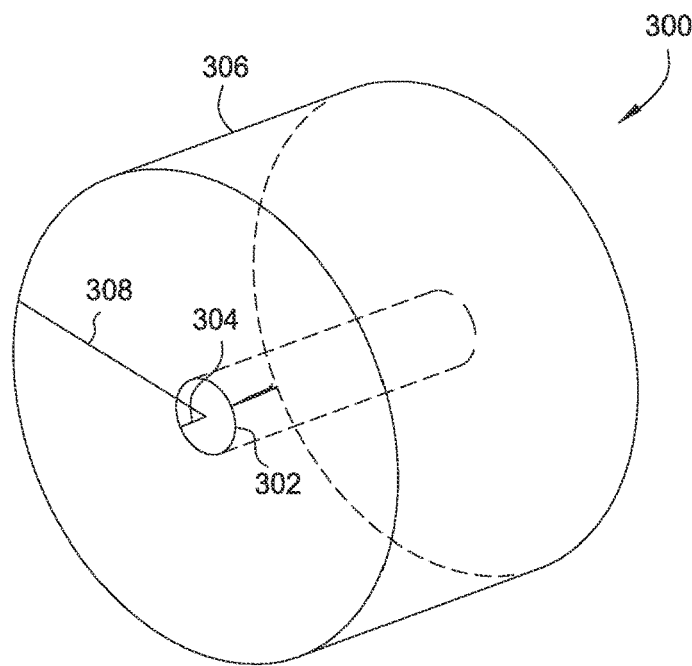
FIGS. 3A-3C illustrate more detailed views of the near-field region in the model of FIG. 2.
Figure 3B:
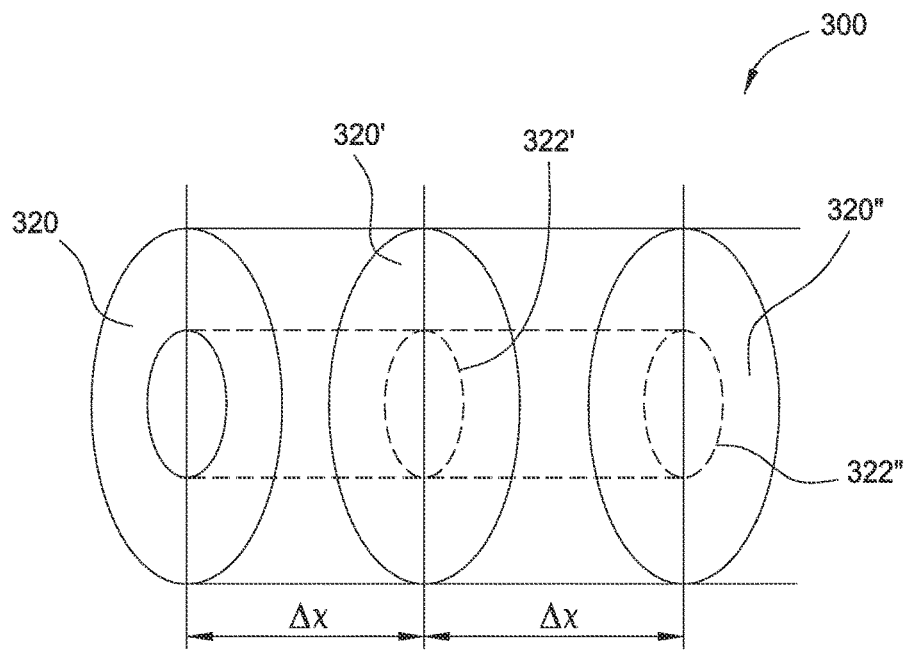
Figure 3C:
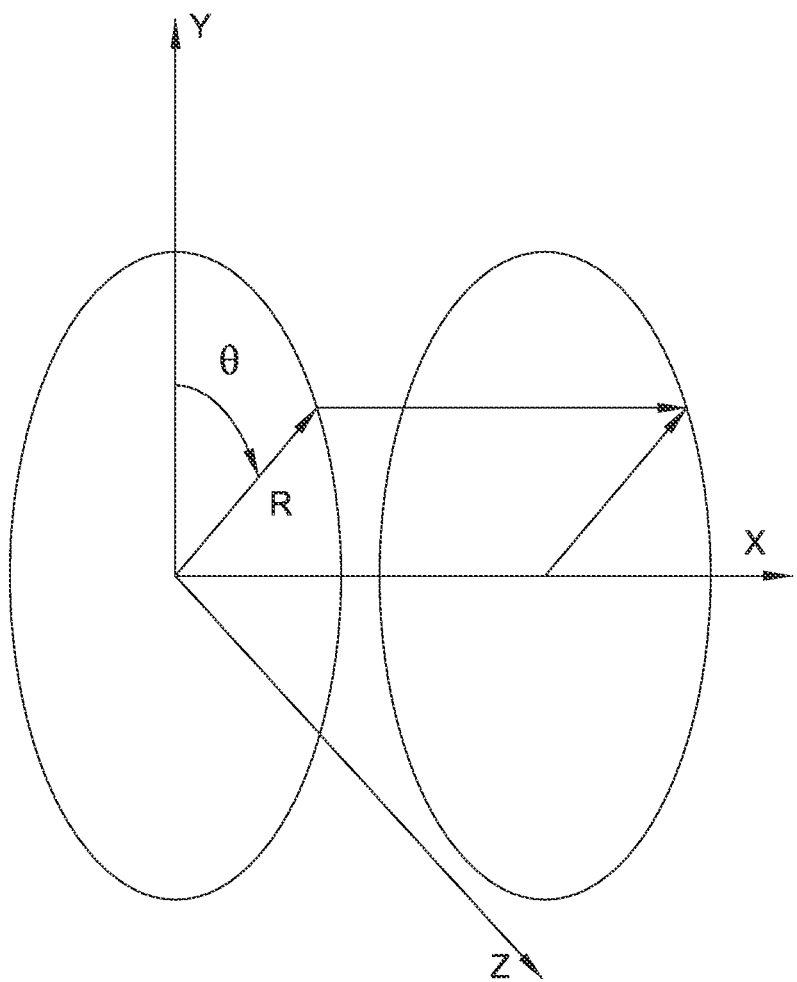

FIGS. 3A-3C illustrate more detailed views of the near field region 208 in the model 200 of FIG. 2. In FIG. 3A, the near field region 208 is illustrated as a cylinder 300 having an inner cylinder 302 with an inner diameter 304 of length 0.5 L. The inner cylinder 302 corresponds to the CFD domain 212. The cylinder 300 further includes an outer cylinder 306 with an outer diameter 308 of length 5.0 L. The space between the outer cylinder 306 and the inner cylinder 302 corresponds to the space marching domain 216, which has an annulus cross section at any axial location. The first signature 204 is used as an initial condition for the space marching approach for the second signature 206.

FIG. 3B illustrates the space marching domain. The space marching method begins with the free stream flow field on an annulus section at an axial location upstream of the aircraft. As the space marching method "marching" one step downstream to the annulus section at the next axial location the flow variables at the inner radius are provided by the CFD model for the inner domain. The space marching solution will be carried out iteratively step by step to sweep through the entire cylinder 300 from upstream to downstream. As illustrated in FIG. 3C, the three dimensions of the flow field include the cylindrical coordinates, r, θ and x, in which r is the radial coordinate, θ is the azimuth coordinate, and x is the axial coordinate oriented along the direction of the free stream airflow encountered by the aircraft.

FIG. 3B illustrates a series of annulus sections 320, 320', 320" of cylinder 300. The first annulus section 320 has an initial free stream boundary condition. Using the initial free stream boundary condition on 320, the user may calculate the solution on a downstream annulus section 320'. On the annulus section 320' the solution on the inner boundary 322' is provided by the CFD model for the inner cylinder domain. Repeating the same procedure in a next step by using the solution on 320' as the initial condition the user can calculate the solution on the annulus 320" further downstream. A step size, $\Delta x$, is shown between annulus sections 320, 320' and annulus sections 320', 322". In FIG. 3B, the step size, $\Delta x$, is exaggerated for illustrative purposes. In one embodiment, the step size, $\Delta x$, may be about $10^{-4}$ or $10^{-5}$ times the length of the aircraft.

The governing equations for the space marching method are as follows:

$$u\frac{\partial \rho}{\partial x} + \rho\frac{\partial u}{\partial x} = -\left[v\frac{\partial \rho}{\partial r} + w\frac{\partial \rho}{\partial \theta} + \rho\left(\frac{\partial v}{\partial r} + \frac{1}{r}\frac{\partial w}{\partial \theta} + \frac{v}{r}\right)\right] \equiv -R \quad (1a)$$

$$u\frac{\partial u}{\partial x} + \frac{1}{\rho}\frac{\partial \rho}{\partial x} = -\left(v\frac{\partial u}{\partial r} + \frac{w}{r}\frac{\partial u}{\partial \theta}\right) \equiv -U \quad (1b)$$

$$\frac{\partial v}{\partial x} = -\left(v\frac{\partial v}{\partial r} + \frac{w}{r}\frac{\partial v}{\partial \theta} - \frac{w^2}{r} + \frac{1}{\rho}\frac{\partial p}{\partial r}\right) \equiv -V \quad (1c)$$

$$u\frac{\partial w}{\partial x} = -\left(v\frac{\partial w}{\partial r} + \frac{w}{r}\frac{\partial w}{\partial \theta} + \frac{vw}{r} + \frac{1}{\rho r}\frac{\partial p}{\partial \theta}\right) \equiv -W \quad (1d)$$

$$u\frac{\partial p}{\partial x} + \gamma p\frac{\partial u}{\partial x} = -\left[v\frac{\partial p}{\partial r} + \frac{w}{r}\frac{\partial p}{\partial \theta} + \gamma p\left(\frac{\partial v}{\partial r} + \frac{1}{r}\frac{\partial w}{\partial \theta} + \frac{v}{r}\right)\right] \equiv -P \quad (1e)$$

$$\frac{\partial q}{\partial r} = \frac{1}{\Delta r}\sum_{i=-M}^{M} a_i q(x, r+i\Delta r, \theta) \quad (3)$$

$$\frac{\partial q}{\partial \theta} = \frac{1}{\Delta \theta}\sum_{j=-M}^{M} a_j q(x, r, \theta+j\Delta\theta) \quad (4)$$

$$\frac{\partial q}{\partial x} = K(q_r, q_\theta) \quad (5a)$$

$$q(x+\Delta x, r, \theta) = q(x, r, \theta) + \Delta x \sum_{k=0}^{N} b_k \frac{\partial q}{\partial x}(x - k\Delta x, r, \theta) \quad (5b)$$

In the above equations, u represents the velocity component in x-direction, v represents the velocity component in r-direction, w represents velocity component in θ-direction, ρ represents the fluid mass density, p represents fluid pressure, γ represents ratio of specific heat, r represents the radius, θ represents azimuth angle, x represent axial coordinate, q represent any flow variables, $a_i$ represents finite different coefficients for derivative approximation, $b_k$ represents marching algorithm coefficients, K represents the right hand side of x-derivative in a differential equation, and Δx, Δr, Δθ represent the grid spacing in x, r and θ directions respectively.

Equations (3) and (4) represent the finite difference approximation of the radial and azimuth derivatives in the Euler equations in equations (1a)-(1e). The discretization of the Euler equations yields the finite difference approximation of radial (equation 3) and azimuth derivatives (equation 4) and a space marching scheme (equations 5a and 5b) in the x-direction. The finite difference approximation is a numerical method for solving differential equations, such as the Euler equations, by approximating them with difference equations, in which finite differences approximate the derivatives. A finite difference stencil is a geometric arrangement of a nodal group that relates the derivative approximation at a point of interest with neighboring grid points. For the space marching method, an optimized high accuracy seven point stencil approach may be used for derivatives in r and 0 directions, and an optimized high accuracy four point marching stencil approach may be used in x-direction.

Figure 4:
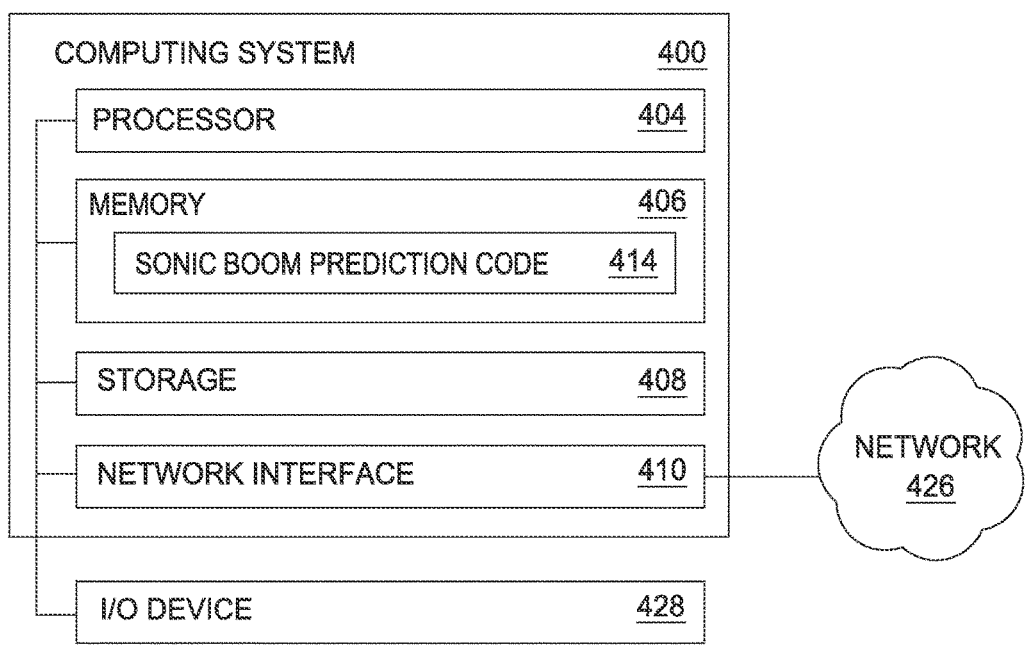
FIG. 4 illustrates a block diagram of a computing system that is configured to carry out a sonic boom prediction method according to an embodiment.

FIG. 4 illustrates a block diagram of a computing system 400 that is configured to carry out a sonic boom prediction method according to an embodiment. The computing system 400 includes a processor 404, memory 406, storage 408, and a network interface 410. The processor 404 is included to be representative of a single processor, multiple processors, a single processor having multiple processing cores, and the like. The storage 408 may be a hard disk drive or a solid state drive. Although shown as a single unit, the storage 408 may be a combination of fixed and/or removable storage devices, such as fixed drives, removable memory cards, optical storage, network attached storage (NAS) or storage-area-network (SAN). The network interface 410 may be any type of network communications allowing the computing system 400 to communicate with other computers via a network 426. The computing system 400 also includes an I/O device 428 (e.g. keyboard and mouse devices) connected to the computing system 400.

The processor 404 is programmed to execute a sonic boom prediction code 414 stored in memory 406, which implements the sonic boom prediction method described above in conjunction with FIGS. 2, 3A and 3B. The sonic boom prediction code 414 includes a first component that implements the CFD model, a second component that implements the space marching model, and a third component that implements the far-field sonic boom propagation model.

Figure 5:
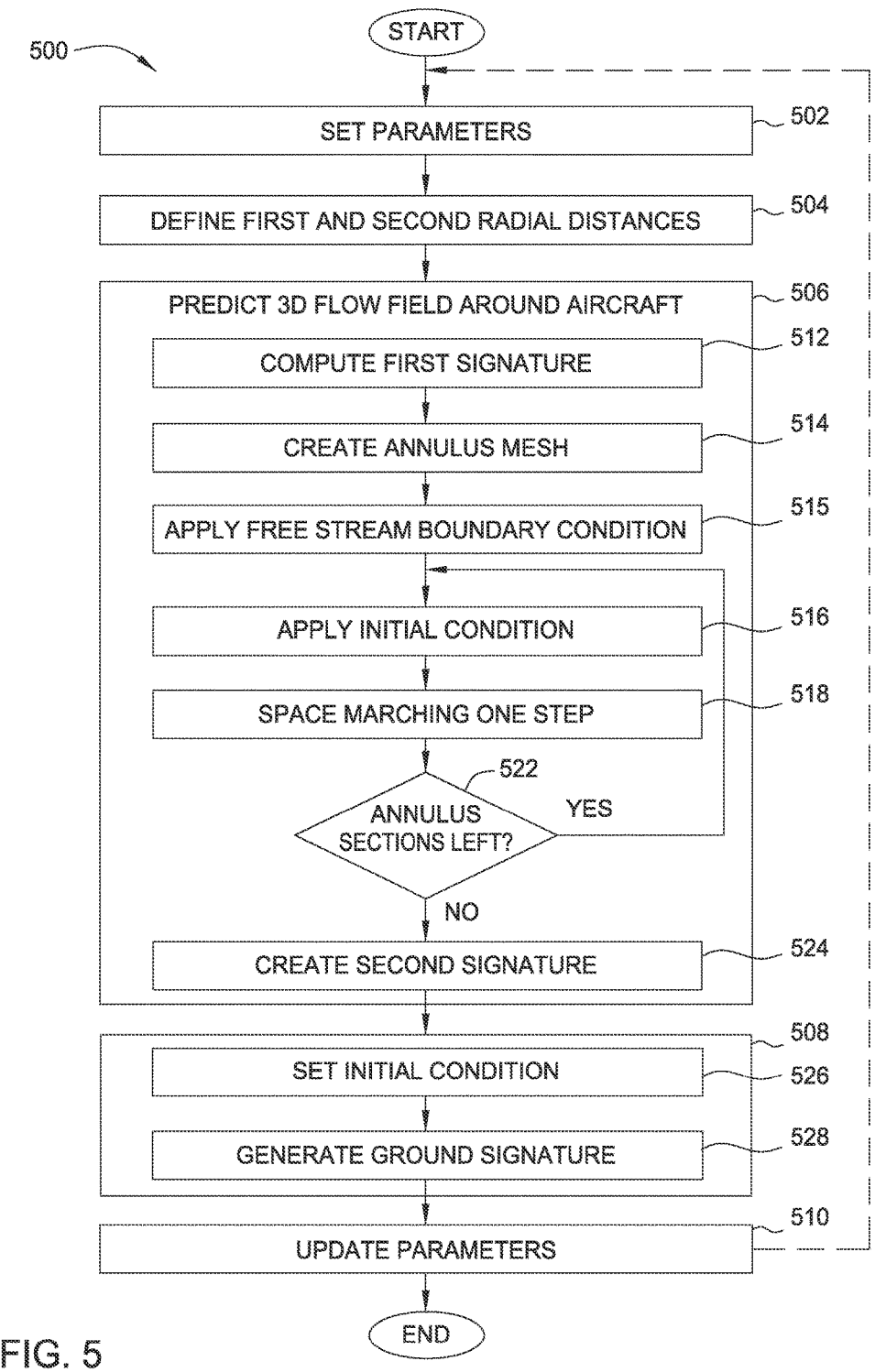
FIG. 5 is a flow diagram of method of designing a supersonic aircraft that incorporates the sonic boom prediction method.

FIG. 5 is a flow diagram 500 for designing a supersonic aircraft that incorporates the sonic boom prediction method. The flow diagram 500 begins at step 502.

At step 502, the computing system sets parameters for a supersonic aircraft. For example, the computing system receives physical parameters and performance parameters that are design targets for the supersonic aircraft. The physical parameters describe the physical geometry of the aircraft design and the performance parameters include airspeed and altitude.

At step 504, the user defines a first radial distance and a second radial distance in a near field region. The first radial distance defines a first region formed around the aircraft. The first radial distance is less than one aircraft length. For example, the first radial distance may be 0.5 L. The second radial distance defines a second region in the near field region. The second radial distance is n-times the first radial distance. For example, the second radial distance may be between 5.0 L and 10.0 L.

At step 506, the computing system estimates the three-dimensional flow around the aircraft. Step 506 includes a plurality of substeps, step 512, 514, 515, 516, 518, 522, and 524.

At step 512, the processor computes a first signature in the first region defined by the first radial distance. The user implements a CFD analysis to generate the first signature. The CFD solution from the CFD analysis is used as a boundary condition for a space marching method in the second region. CFD analysis involves both a human component and a computer component. First, the geometry of the problem is defined. The user defines geometry by setting the physical bounds of the problem. The geometry may also be automatically defined or modified in certain design environments. After the geometry is defined, the volume occupied by the object is divided into cells. This may be done through the use of a mesh to model the object to be analyzed. The finer the mesh, the more mesh points created, which increases the accuracy of the CFD calculation. However, the increased mesh points lengthen the CFD calculation time. Thus, there is a tradeoff between accuracy and efficiency in CFD analysis. The physical modeling of the object is then defined. For example, conservation laws for mass, energy, and momentum for the objects are calculated. Additionally, any boundary conditions are set by the user. The information is then provided to a computer for simulation. The equations are solved iteratively to produce a CFD result.

At step 514, the user partitions the region defined between the first radial distance and the second radial distance into a plurality of annulus sections at multiple axial locations separated by marching step size Δx.

At step 515, the user defines an initial boundary condition using the free stream flow at the first annulus section, which is upstream of the aircraft.

At step 516, the user defines an initial condition for a space marching method at the inner radius of the next annulus sections. CFD solution determined in the CFD analysis in step 512 is used to provide the solution values for the initial condition.

At step 518, the processor applies the space marching method to calculate the solution at the next annulus section. The high order finite difference method applied to the space marching process improves the accuracy of wave propagation over a long distance. The high order finite difference method is much more accurate and grid efficient than low order methods used in conventional CFD approaches. A finite difference stencil is a geometric arrangement of a nodal group that relates the derivative approximation at a point of interest with neighboring grid points. For the space marching method, an optimized high order seven point stencil approach may be used for derivatives in r and θ directions, and an optimized high order four point stencil approach may be used for marching in x direction.

At decision block 522, the processor determines whether there are any annulus sections left in the cylinder. If there are annulus sections left in the cylinder, then the method reverts to step 516. If there are not any annulus sections left, then at step 524 the computing system generates the second signature. The second signature is generated by outputting solutions at outer boundary of all the annulus sections.

At step 508, the computing system estimates sonic boom signatures on the ground. The sonic boom signatures on the ground are estimated using the long distance sonic boom propagation model as described above. Step 508 includes substeps 526 and 528.

At step 526, the user sets an initial condition for generating a ground signature. The second signature generated in step 524 is used as an initial condition.

At step 528, the computing system uses a long distance boom propagation model in a far-field region to generate the ground signature. The long distance boom propagation model follows a ray path from the aircraft to the ground surface.

At step 510, the user updates parameters of the aircraft based on the ground signature generated in step 528. Optionally, the user may restart the flow diagram 500 using the adjusted parameters. Additionally, the user may restart the flow diagram 500 to generate ground signatures at positions on the ground surface that are offset by an angle with respect to the flight path of the supersonic aircraft. For example, the user may generate ground signatures at angles between 0° and 45°.

Figure 6B:
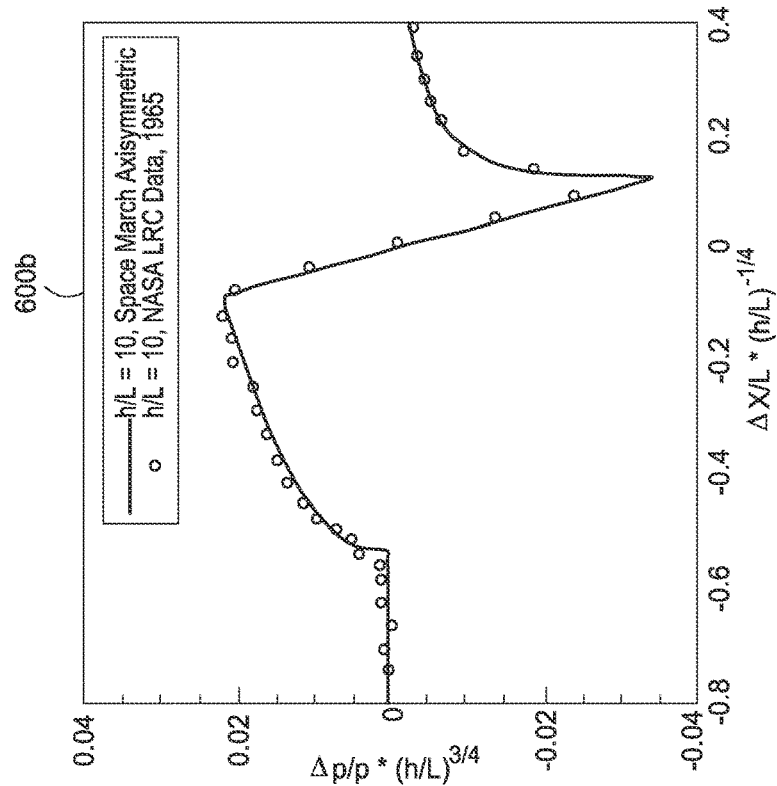
FIGS. 6A-6B illustrate graphs comparing data generated using the sonic boom prediction method according to the embodiment with experimental data.
Figure 6A:
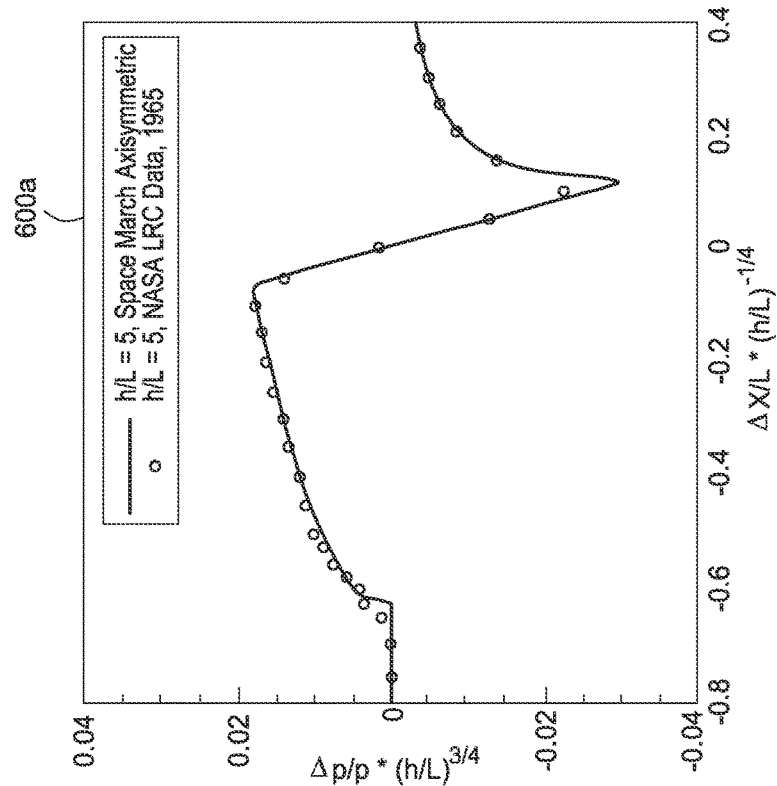

FIGS. 6A and 6B illustrate graphs comparing near field sonic boom signatures directly beneath a wind tunnel model generated using the sonic boom prediction method according to the embodiment and the experimental data. The experimental data was generated using Model 1 reported in Carlson, H. W., Mack, R. J. and Morris, O. A., (1965) "A Wind-Tunnel Investigation of the Effect of Body Shape on Sonic-Boom Pressure Distributions," NASA TN-D 3160, 1965. FIG. 6A illustrates a graph 600a wherein the second radial distance is 5.0 L. FIG. 6B illustrates a graph 600b wherein the second radial distance is 10.0 L. As evident by graphs 600a and 600b, the space marching method fits closely to the experimental data.

Figure 7:
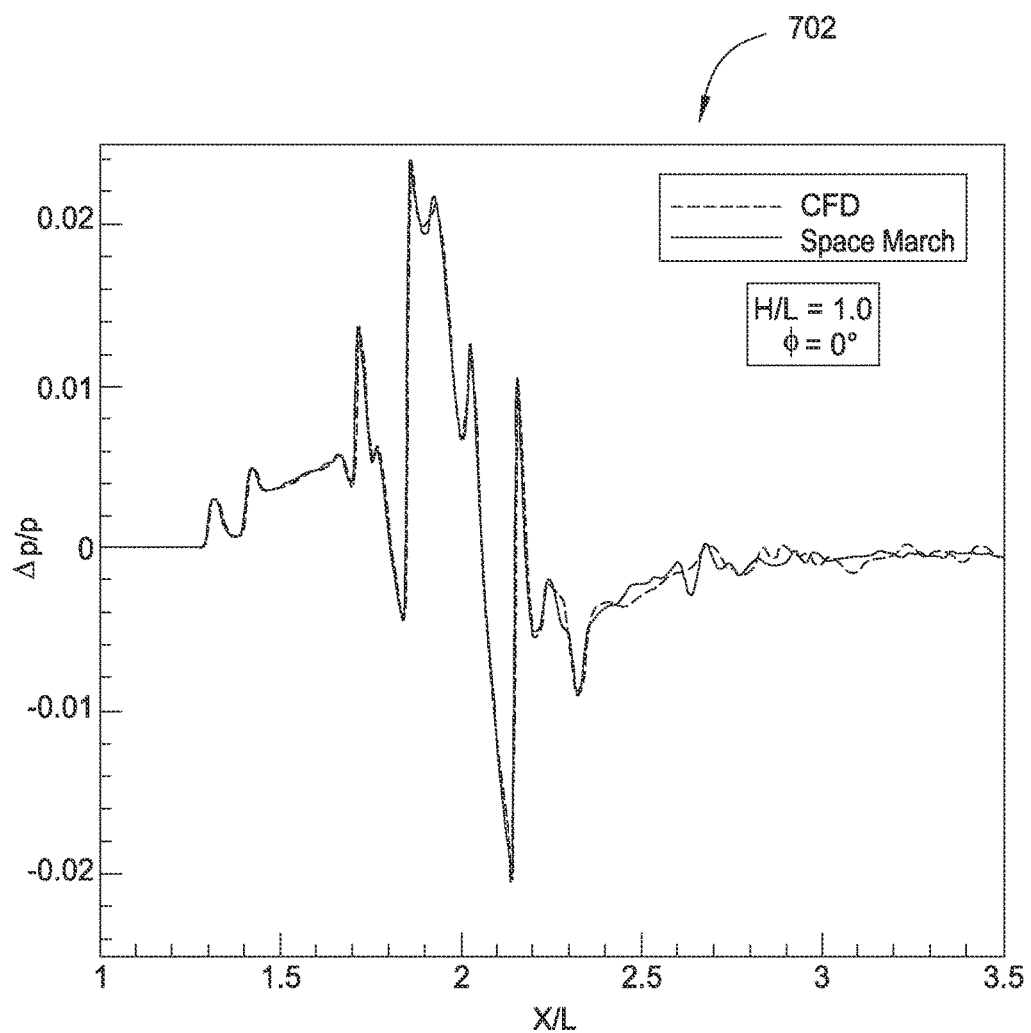
FIG. 7 illustrate graphs comparing sonic boom signatures directly beneath the aircraft generated using the sonic boom prediction method according to the embodiment and a computational fluid dynamics method.

FIG. 7 illustrates graph 702 comparing signatures directly beneath the aircraft at a radial distance of 1.0 L from a CFD analysis and a space marching method. The graph 702 compares the change in pressure along the y-axis versus the distance (x) over the aircraft length (l), i.e. X/L, along the x-axis.

Comparisons between the space marching method and the CFD near-field solutions show that at a small radial distance (e.g. 1.0 L), the CFD solution is very close to the space marching solution. Thus, graph 702 demonstrates that the space marching method is as accurate as the conventional CFD method when numerical error in CFD is under control in a small computational domain.

FIGS. 8A-8D illustrate graphs comparing sonic boom near field signature comparisons at different angles with respect to the flight path of the supersonic aircraft using the sonic boom prediction method according to the embodiment and a computational fluid dynamics method. Each graph 802a-802d compares the change in pressure over the free stream pressure (Δp/p) along the y-axis versus the distance (x) over the aircraft length (l), i.e. X/L, along the x-axis.

Figure 8A:
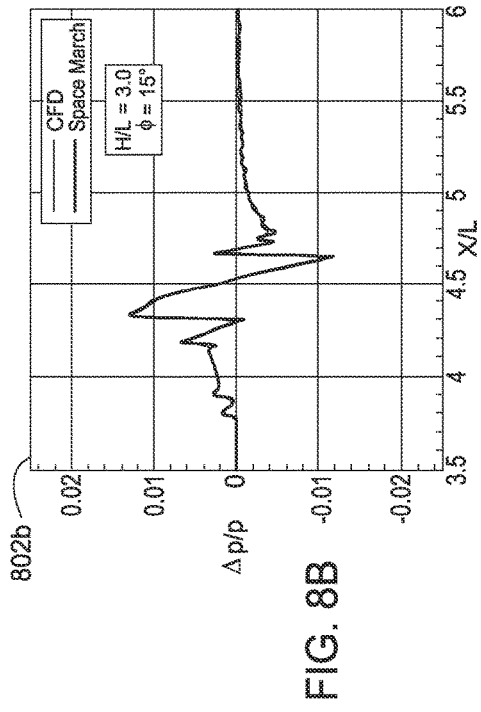
FIGS. 8A-8D illustrate graphs comparing sonic boom signature comparisons at different angles with respect to the flight path of the supersonic aircraft using the sonic boom prediction method according to the embodiment and a computational fluid dynamics method.
Figure 8B:
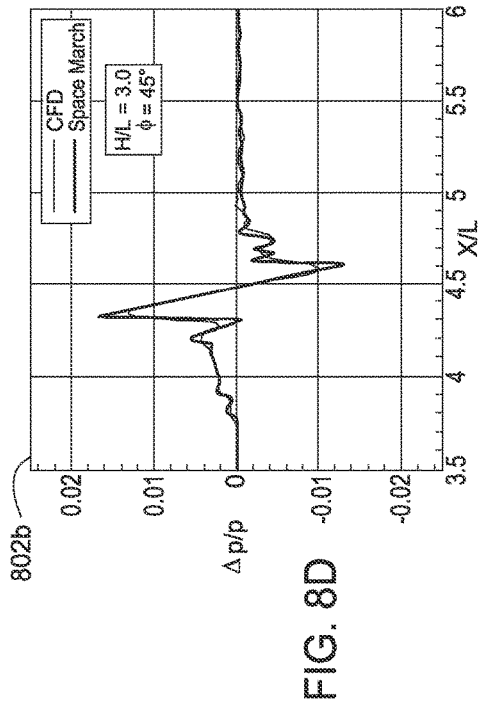
Figure 8C:
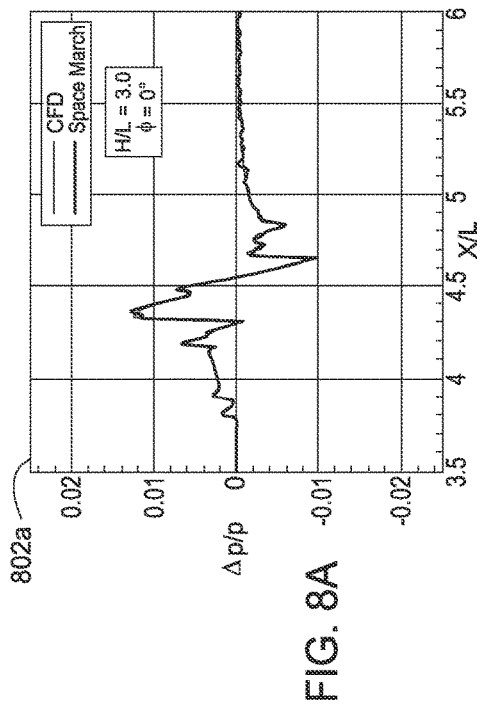
Figure 8D:
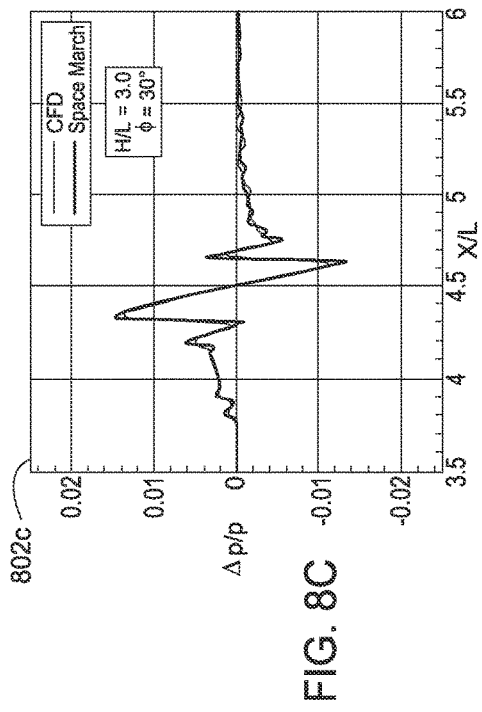

FIG. 8A illustrates graph 802a, wherein the angle with respect to the flight path of the supersonic aircraft is 0°. FIG. 8B illustrates graph 802b, wherein the angle with respect to the flight path of the supersonic aircraft is 15°. FIG. 8C illustrates graph 802c, wherein the angle with respect to the flight path of the supersonic aircraft is 30°. FIG. 8D illustrates graph 802d, wherein the angle with respect to the flight path of the supersonic aircraft is 45°.

The near-field off track signatures obtained from the space marching and CFD models largely agree, such as that shown in FIGS. 8A and 8B. However, at large angles, such as that shown in FIGS. 8C and 8D, the space marching model provides a better resolution of the peaks and troughs, and is thus becomes an effective tool in estimating ground signatures of the sonic boom not only at positions directly under the flight path of the supersonic aircraft but at positions offset therefrom, even at angles as large as 30-45 degrees.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "FORTRAN" or "C" programming language or similar programming languages. The computer readable program instructions may execute entirely on the user's computer, partly on the user's computer, as a stand-alone software package, partly on the user's computer and partly on a remote computer or entirely on the remote computer or server or a multi-processor High Performance Computing (HPC) system with CPUs and GPUs. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications such as the sonic boom prediction method or related data available in the cloud. For example, the sonic boom prediction method could execute on a computing system in the cloud and predict signatures on the ground for use in designing a supersonic aircraft. In such a case, the sonic boom prediction method could generate the ground signatures and store the ground signatures at a storage location in the cloud. In such a case, the user may access ground signatures for aircrafts with specific parameters in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented sonic boom prediction method for use in designing a supersonic aircraft, the method comprising:
    receiving a plurality of parameters for a supersonic aircraft, the plurality of parameters comprising physical parameters and performance parameters;
    partitioning a near field region of the supersonic aircraft into a first region and a second region, wherein the first region extends to a first distance from the supersonic aircraft, and wherein the second region extends from the first distance to a second distance;
    generating a three-dimensional (3D) flow field around the supersonic aircraft for at least one airspeed and at least one flight altitude, wherein generating the 3D flow field comprises:
        generating a first flow field for the first region using a computational fluid dynamics (CFD) model; and
        generating a second flow field for the second region using a propagation model, wherein the first flow field generated using the CFD model is used as a boundary condition for the propagation model;
    estimating sonic boom signatures on a ground surface using a long distance sonic boom propagation model, wherein the second flow field using the propagation model is used as an initial condition for the long distance sonic boom propagation model; and
    adjusting one or more of the plurality of parameters of the supersonic aircraft to reduce the estimated sonic boom signatures.

2. The computer-implemented sonic boom prediction method of claim 1, wherein the first distance is defined by a cylinder surface enclosing the entire aircraft at a distance of about 0.5 times an aircraft length, and the second distance is greater than the first radial distance and is about 10.0 times the aircraft length.

3. The computer-implemented sonic boom prediction method of claim 1, wherein estimating the sonic boom signatures corresponds to a far field region spanning a distance between the second distance and a position on the ground surface under a flight path of the aircraft.

4. The computer implemented sonic boom prediction method of claim 1, wherein the first distance encloses the entire aircraft.

5. The computer-implemented sonic boom prediction method of claim 1, wherein the sonic boom signatures on the ground surface are estimated at positions on the ground surface directly under a flight path of the supersonic aircraft and at other positions that are offset by an angle with respect to the flight path of the supersonic aircraft.

6. The computer-implemented sonic boom prediction method of claim 1, wherein generating the 3D flow field around the supersonic aircraft using the propagation model comprises:
    performing a space marching method from upstream to downstream in an annular volume between the first distance and the second distance.

7. The computer-implemented sonic boom prediction method of claim 6, wherein the space marching method comprises:
    iteratively choosing multiple points between the first distance and the second distance to calculate derivatives in radial and azimuth directions and to update a flow solution, the multiple points being chosen to improve wave propagation from the first distance to the second distance.

8. The computer-implemented sonic boom prediction method of claim 1, wherein using the long distance sonic boom propagation model comprises:
    generating a one-dimensional wave propagation model along a ray path extending from the second distance to the ground surface.

9. A system for modeling sonic boom signatures of a supersonic aircraft in connection with a design of the supersonic aircraft, the system comprising:
    a processor; and
    a memory storing program code, which, when executed on the processor performs an operation for computer-implemented sonic boom prediction, the operation comprising:
        receiving a plurality of parameters for a supersonic aircraft, the plurality of parameters comprising physical parameters and performance parameters;
        partitioning a near field region of the supersonic aircraft into a first region and a second region, wherein the first region extends to a first distance from the supersonic aircraft, and wherein the second region extends from the first distance to a second distance;

generating a three-dimensional (3D) flow field around the supersonic aircraft for at least one airspeed and at least one flight altitude, wherein generating the 3D flow field comprises:
generating a first flow field for the first region using a computational fluid dynamics (CFD) model; and
generating a second flow field for the second region using a propagation model, wherein the first flow field generated using the CFD model is used as a boundary condition for the propagation model; and
estimating sonic boom signatures on a ground surface using a long distance sonic boom propagation model, wherein the second flow field using the propagation model is used as an initial condition for the long distance sonic boom propagation model.

10. The system of claim 9, wherein the first distance is defined by a cylinder surface enclosing the entire aircraft at a distance of about 0.5 times an aircraft length, and the second distance is greater than the first distance and is about 10.0 times the aircraft length.

11. The system of claim 9, the operation further comprising:
adjusting one or more of the plurality of parameters of the supersonic aircraft to reduce the estimated sonic boom signatures.

12. The system of claim 9, wherein generating the 3D flow field around the supersonic aircraft using the propagation model comprises:
performing a space marching method from upstream to downstream in an annular volume between the first distance and the second distance.

13. The system of claim 12, wherein the space marching method comprises:
iteratively choosing multiple points between the first distance and the second distance to calculate derivatives in radial and azimuth directions and to update a flow solution, the multiple points being chosen to improve wave propagation from the first distance to the second distance.

14. The system of claim 9, wherein the sonic boom signatures on the ground surface are estimated at positions on the ground surface directly under a flight path of the supersonic aircraft and at other positions that are offset by an angle with respect to the flight path of the supersonic aircraft.

15. The system of claim 9, wherein estimating sonic boom signatures on the ground surface using the long distance sonic boom propagation model comprises:
generating a one-dimensional wave propagation model along a ray path extending from the second distance to the ground surface.

16. A computer readable storage medium having stored thereon instructions that, when executed by a processor, cause the processor to perform a sonic boom prediction method for use in designing a supersonic aircraft, said method comprising:
receiving a plurality of parameters for a supersonic aircraft, the plurality of parameters comprising physical parameters and performance parameters;
partitioning a near field region of the supersonic aircraft into a first region and a second region, wherein the first region extends to a first distance from the supersonic aircraft, and wherein the second region extends from the first distance to a second distance;
generating a three-dimensional (3D) flow field around the supersonic aircraft for at least one airspeed and at least one flight altitude, wherein generating the 3D flow field comprises:
generating a first flow field for the first region using a computational fluid dynamics (CFD) model; and
generating a second flow field for the second region using a propagation model, wherein the first flow field generated using the CFD model is used as a boundary condition for the propagation model; and
estimating sonic boom signatures on a ground surface using a long distance sonic boom propagation model, wherein the second flow field using the propagation model is used as an initial condition for the long distance sonic boom propagation model.

17. The computer readable storage medium of claim 16, wherein the first distance encloses the entire aircraft.

18. The computer readable storage medium of claim 16, wherein the sonic boom signatures on the ground surface are estimated at positions on the ground surface directly under a flight path of the supersonic aircraft and at other positions that are offset by an angle with respect to the flight path of the supersonic aircraft.

19. The computer readable storage medium of claim 16, wherein generating the 3D flow field around the supersonic aircraft using the propagation model comprises:
performing a space marching method from upstream to downstream in an annular volume between the first distance and the second distance.

20. The computer readable storage medium of claim 16, wherein using the long distance sonic boom propagation model comprises:
generating a one-dimensional wave propagation model along a ray path extending from the second distance to the ground surface.

* * * * *